United States Patent
Katoh et al.

(10) Patent No.: US 6,825,630 B2
(45) Date of Patent: Nov. 30, 2004

(54) MACHINE TOOL, TOOL, AND TOOL HOLDER

(75) Inventors: Kouichi Katoh, Shizuoka-ken (JP); Yasunori Kato, Shizuoka-ken (JP); Takazumi Watanabe, Shizuoka-ken (JP); Makoto Sagara, Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/197,267

(22) Filed: Jul. 18, 2002

(65) Prior Publication Data

US 2004/0012359 A1 Jan. 22, 2004

(51) Int. Cl.⁷ ............................................... G05B 11/01
(52) U.S. Cl. .................... 318/560; 318/140; 318/146; 318/147; 318/567; 318/569; 318/574; 318/600; 318/727; 388/937; 29/40; 408/124; 408/146; 408/159; 408/186; 408/187; 408/199; 409/201; 409/224; 409/230
(58) Field of Search ................................. 318/140–158, 318/727, 560–569, 574, 600; 408/124, 146, 186–187, 199, 159, 46, 234–236; 409/230, 224, 201, 231, 232, 233; 388/937; 29/40; 228/112.1; 606/1; 92/13.3; 700/251, 262

(56) References Cited

U.S. PATENT DOCUMENTS

| | | | |
|---|---|---|---|
| 3,752,595 A | | 8/1973 | Woythal et al. |
| 3,775,837 A | * | 12/1973 | Tomita et al. ................. 483/7 |
| 3,874,071 A | * | 4/1975 | Kato ............................. 483/7 |
| 4,077,736 A | | 3/1978 | Hutchens |
| 4,087,890 A | * | 5/1978 | Ishizuka et al. ............ 29/27 C |
| 4,355,446 A | * | 10/1982 | Shimajiri et al. ........... 29/26 A |
| 4,519,734 A | * | 5/1985 | Mitchell et al. ............. 409/231 |
| 4,545,708 A | * | 10/1985 | Buschhoff et al. ............ 409/49 |
| 4,608,643 A | * | 8/1986 | Breitenstein et al. ....... 700/164 |

(List continued on next page.)

FOREIGN PATENT DOCUMENTS

| | | | |
|---|---|---|---|
| GB | 2014332 | 8/1979 | |
| GB | 2 014 332 | 8/1979 | ................. 409/193 |
| JP | 63-109941 | 5/1988 | ................. 409/231 |
| JP | 363109941 A | 5/1988 | |

OTHER PUBLICATIONS

U.S. patent application Ser. No. 10/268,987, Kato, filed Oct. 11, 2002.

(List continued on next page.)

*Primary Examiner*—Rina Duda
*Assistant Examiner*—Renata McCloud
(74) *Attorney, Agent, or Firm*—Pillsbury Winthrop LLP

(57) ABSTRACT

A longer life, low cost tool and tool holder enabling change of posture with respect to a spindle, having a high machining accuracy of a workpiece, and resistant to generation of vibration or heat, provided with a working tool for processing a workpiece, a motor having an output shaft to which the working tool is connected and rotating the working tool, a first holder for holding the working tool and the motor, a mount attached to the spindle, a generator to which rotational force is transmitted from the spindle through the mount and generating electric power for driving the motor, a second holder for holding the mount rotatably, holding the generator, and engaged with a nonrotating portion of the machine tool, and a posture adjustment mechanism which connects the first holder and the second holder and is able to change the posture of the working tool with respect to the spindle.

16 Claims, 7 Drawing Sheets

U.S. PATENT DOCUMENTS

| | | | | |
|---|---|---|---|---|
| 4,692,074 A | * | 9/1987 | Smith et al. | 409/233 |
| 4,716,657 A | | 1/1988 | Collingwood | |
| 4,741,650 A | | 5/1988 | Nakata | |
| 4,789,280 A | * | 12/1988 | Dobat et al. | 409/233 |
| 4,805,404 A | | 2/1989 | Dupin | |
| 4,826,092 A | * | 5/1989 | Tsugawa | 242/433.4 |
| 5,100,271 A | * | 3/1992 | Kameyama et al. | 409/231 |
| 5,139,094 A | * | 8/1992 | Prevedel et al. | 175/61 |
| 5,161,291 A | * | 11/1992 | Guenther | 29/56.5 |
| 5,238,340 A | * | 8/1993 | Ochiai et al. | 409/201 |
| 5,290,130 A | * | 3/1994 | Beretta | 409/131 |
| 5,564,872 A | | 10/1996 | Veil et al. | |
| 5,581,166 A | * | 12/1996 | Eismann et al. | 318/568.22 |
| 5,636,949 A | | 6/1997 | Nakamura et al. | |
| 5,697,739 A | | 12/1997 | Lewis et al. | |
| 5,718,545 A | * | 2/1998 | Husted | 409/201 |
| 5,759,000 A | * | 6/1998 | Wawrzyniak et al. | 409/231 |
| 5,820,623 A | * | 10/1998 | Ng | 606/1 |
| 5,893,507 A | * | 4/1999 | Ding et al. | 228/2.1 |
| 5,921,731 A | | 7/1999 | Chandrasekar | 409/231 |
| 6,026,558 A | * | 2/2000 | Yoshida et al. | 29/598 |
| 6,264,409 B1 | * | 7/2001 | Date et al. | 409/233 |
| 6,416,450 B2 | * | 7/2002 | Susnjara | 483/47 |
| 6,554,175 B1 | * | 4/2003 | Thompson | 228/112.1 |
| 6,732,971 B2 | * | 5/2004 | Stratico et al. | 242/432.6 |
| 2001/0049325 A1 | | 12/2001 | Katoh et al. | |
| 2002/0044284 A1 | * | 4/2002 | Webb | 356/399 |

OTHER PUBLICATIONS

U.S. patent application Ser. No. 10/305,079, Watanabe, filed Nov. 27, 2002.

U.S. patent application Ser. NO. 10/305,132, Katsumata et al., filed Nov. 27, 2002.

U.S. patent application Ser. No. 10/268,932, Endo et al., filed Oct. 11, 2002.

U.S. patent application Ser. No. 10/270,248, Adachi et al., filed Oct. 15, 2002.

U.S. patent application Ser. No. 09/866,943, Katoh et al., filed May 30, 2001.

* cited by examiner

MACHINE TOOL, TOOL, AND TOOL HOLDER

BACKGROUND OF THE INVENTION

1. Field of the Invention

The present invention relates to a tool, a tool holder, and a machine tool.

2. Description of the Related Art

A machining center is a multiple-function machine tool able to perform various types of machining operations such as facing, drilling, boring, and tapping. The multiple-function machining by a machining center includes machining using so-called attachments having certain mechanisms at the tools themselves. As such attachments, for example, there are known ones which change the orientation of the cutter with respect to the spindle of the machining center, ones which increase the rotational speed of the cutter from the rotational speed of the spindle, etc.

Attachments able to change the orientation of the cutter with respect to the spindle to machine a workpiece require a tilt mechanism for changing the posture of the cutter with respect to the spindle, a gear mechanism for transmitting the rotational force of the spindle to the cutter, and other transmission mechanisms.

If there is a tilt mechanism or transmission mechanism between the spindle and cutter, however, the mechanical error of the tilt mechanism or transmission mechanism easily has an effect on the machining accuracy of the workpiece. Further, if there is a gear mechanism etc. between the spindle and the cutter, vibration or heat easily occurs and easily has an effect on the machining accuracy of the workpiece. Further, if using a gear mechanism or other transmission mechanism, the service life is relatively short. Further, since a tilt mechanism or transmission mechanism is built into the limited space of an attachment, the structure easily becomes complicated and the manufacturing cost becomes higher.

SUMMARY OF THE INVENTION

An object of the invention is to provide a long service life, low cost tool attachable to a spindle and tool holder enabling a change of posture of the tool with respect to the spindle, giving a high machining accuracy of a workpiece, and generating little vibration or heat.

Another object of the present invention is to provide a machine tool provided with such a tool and tool holder.

According to a first aspect of the invention, there is provided a tool to be attached to a spindle of a machine tool, having a working tool for machining a workpiece, a motor having an output shaft to which the working tool is connected and rotating the working tool, a first holder for holding the working tool and the motor, a mount attached to the spindle, a generator to which rotational force is transmitted from the spindle through the mount and generating electric power for driving the motor, a second holder for holding the mount rotatably, holding the generator, and engaged with a nonrotating portion of the machine tool, and a posture adjustment mechanism connecting the first holder and the second holder in a manner able to change the posture of the working tool with respect to the spindle.

According to a second aspect of the invention, there is provided a tool holder for rotatably holding a working tool for processing a workpiece and attached to a spindle of a machine tool body, having a motor for rotating the working tool, a first holder for rotatably holding the working tool and holding the motor, a mount attached to the spindle, a generator to which rotational force is transmitted from the spindle through the mount and generating electric power for driving the motor, a second holder for holding the mount rotatably, holding the generator, and engaged with a nonrotating portion of the machine tool, and a posture adjustment mechanism connecting the first holder and the second holder in a manner able to change the posture of the working tool with respect to the spindle.

According to a third aspect of the invention, there is provided a machine tool having a machine tool body comprising a spindle, a drive means for driving the spindle, and at least one control axis for changing a relative position between the spindle and a workpiece; a control unit for controlling the drive of the drive means and control axis in response to a machining program; and a tool attached to the spindle of the machine tool body, wherein the tool is provided with a working tool for processing a workpiece, a motor having an output shaft to which the working tool is connected and rotating the working tool, a first holder for holding the working tool and the motor, a mount attached to the spindle, a generator to which rotational force is transmitted from the spindle through the mount and generating electric power for driving the motor, a second holder for holding the mount rotatably, holding the generator, and engaged with a nonrotating portion of the machine tool, and a posture adjustment mechanism connecting the first holder and the second holder in a manner able to change the posture of the working tool with respect to the spindle.

In the present invention, when the spindle rotates, the generator generates power. The electric power generated by the generator is supplied to the motor. The motor then drives the working tool. The rotational speed of the tool with respect to the rotational speed of the spindle changes in response to the properties of the generator and motor.

Further, in the present invention, it is possible to change the posture of the working tool with respect to the spindle. That is, it is possible to handle various machining operations since the posture of the working tool with respect to a workpiece can be changed. Further, when changing the posture of the working tool, the motor also changes in posture, so there is no need for a transmission mechanism for transmitting rotational power to the working tool.

BRIEF DESCRIPTION OF THE DRAWINGS

These and other objects and features of the present invention will become more apparent from the following description of the preferred embodiments given with reference to the attached drawings, in which.

DESCRIPTION OF THE PREFERRED EMBODIMENTS

A preferred embodiment of the present invention will be described in detail below while referring to the attached figures.

Figure 1:
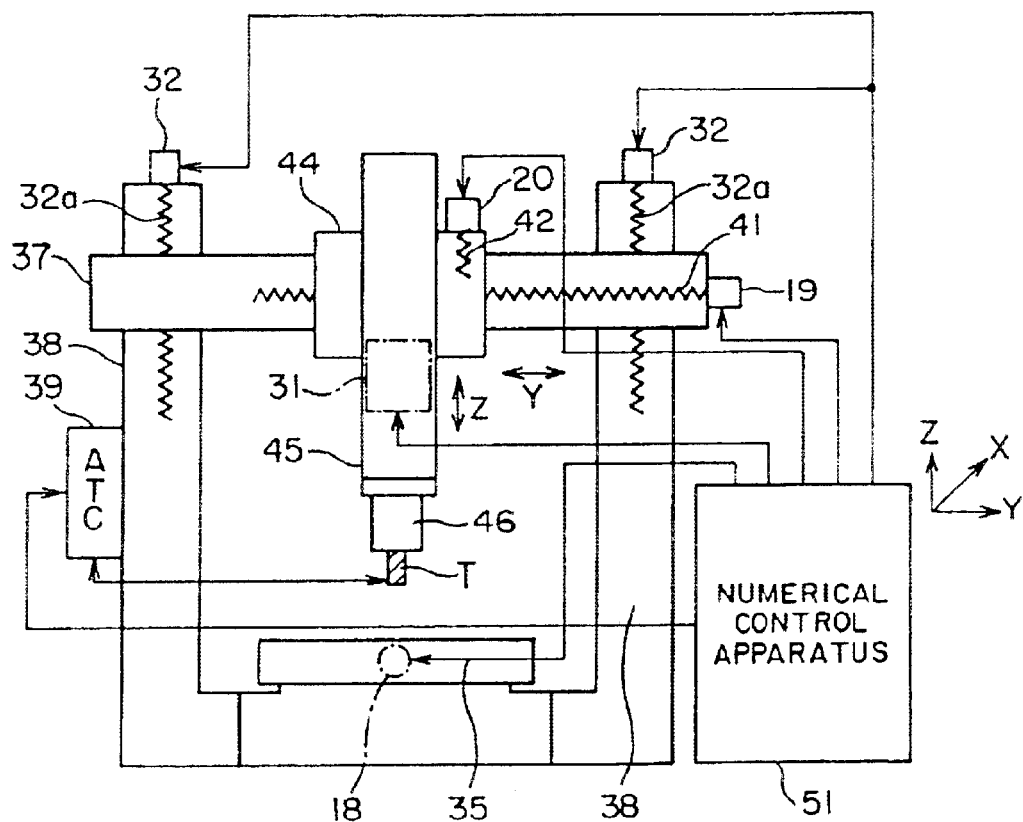
FIG. 1 is a view of the configuration of a machining center as an example of a machine tool to which the present invention is applied.

FIG. 1 is a view of the configuration of a machining center as an example of a machine tool to which the present invention is applied. Note that the machining center is a numerically controlled machining center able to perform multiple machining operations.

In FIG. 1, the machining center 1 is provided with a cross rail 37 movably supported at its two ends by shafts of a gantry-type column 38. A ram 45 is provided movably in a vertical direction (Z-axial direction) through a saddle 44 supported movably on the cross rail 37.

The saddle 44 is formed with a not shown thread in the horizontal direction at the inside facing the cross rail 37. This thread is engaged with a feed shaft 41 formed with a thread on its outer periphery.

One end of the feed shaft 41 is connected to a servo motor 19. The feed shaft 41 is driven to rotate by the servo motor 19.

Due to the driven rotation of the feed shaft 41, the saddle 44 can move in the Y-axial direction. Due to this, the ram 45 in moved and positioned in the Y-axial direction.

Further, the saddle 44 is formed with a not shown thread in the vertical direction. The thread of the saddle 44 is engaged with a feed shaft 42 formed with a thread at its periphery. The end of the feed shaft 42 is connected to a servo motor 20.

The feed shaft 42 is driven to rotate by the servo motor 20. Due to rotation of the feed shaft 42, the ram 45 provided movably on the saddle 40 is moved and positioned in the Z-axial direction.

The ram 45 has built into it a spindle motor 31. This spindle motor 31 drives the rotation of the spindle 46 hold rotatably at the ram 45.

The front end of the spindle 46 has an end mill or other tool T attached to it. The tool T is driven by rotation of the spindle 46.

Below the ram 45 is provided a table 35 able to move in the X-axial direction. The table 35 is formed with a not shown thread. This is engaged with a not shown food shaft provided along the X-axial direction. This not shown feed shaft is connected to a servo motor 18.

The table 35 is moved and positioned in the X-axial direction by the rotational drive of the servo motor 18.

The two shafts of the gantry-type column 38 are formed with not shown threads. By driving the rotation of feed shafts 32a engaging with these by cross rail elevating motors 32, the cross rail 37 is elevated or lowered.

An automatic tool changer (ATC) 39 automatically changes various types of tools T at the spindle 46.

This automatic tool changer 39 for example stores various tools T hold by tool holders in a not shown magazine. A tool T attached to the spindle 46 is stored in the magazine by a not shown tool changing arm. A required tool T is attached to the spindle 46 by the tool changing arm.

A numerical control device 51 controls the drive operations of the above servo motors 18, 19, and 20, the cross rail elevating motors 32, and the spindle motor 31.

The numerical control device 51 specifically positions and controls the speed of the tool T and the workpiece by the servo motors 18, 19, and 20 in accordance with a machining routine of the workpiece defined by a machining program in advance. Further, the numerical control device 51 controls the rotational speed of the spindle 46 by for example reading the rotational speed or the spindle 31 defined by an S-code in the machining program.

Further, the numerical control device 51 for example reads the operation for changing the tool T defined by an M-code in the machining program to automatically change a tool T.

Figure 2:
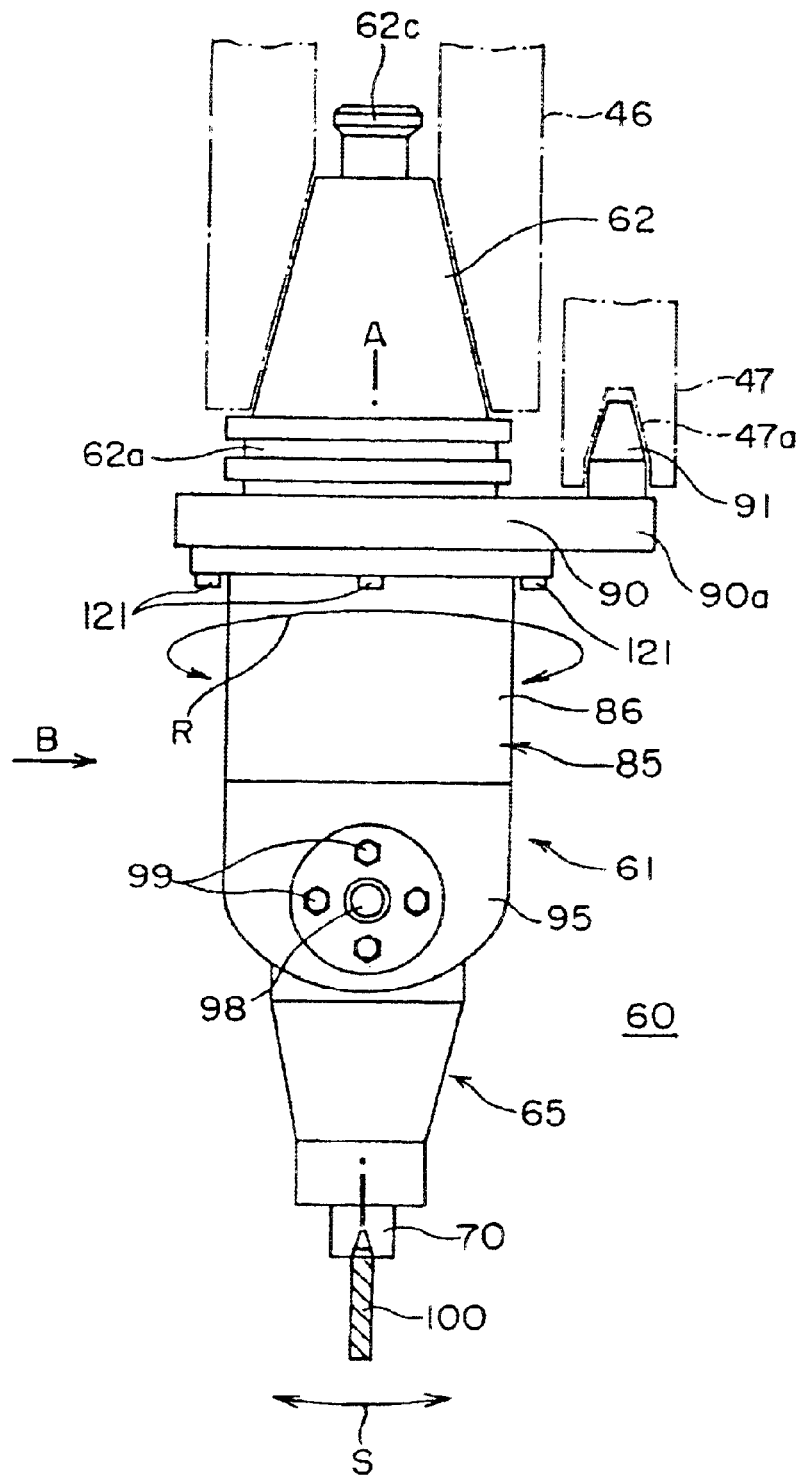
FIG. 2 is a front view of the configuration of a tool according to an embodiment of the present invention.
Figure 3:
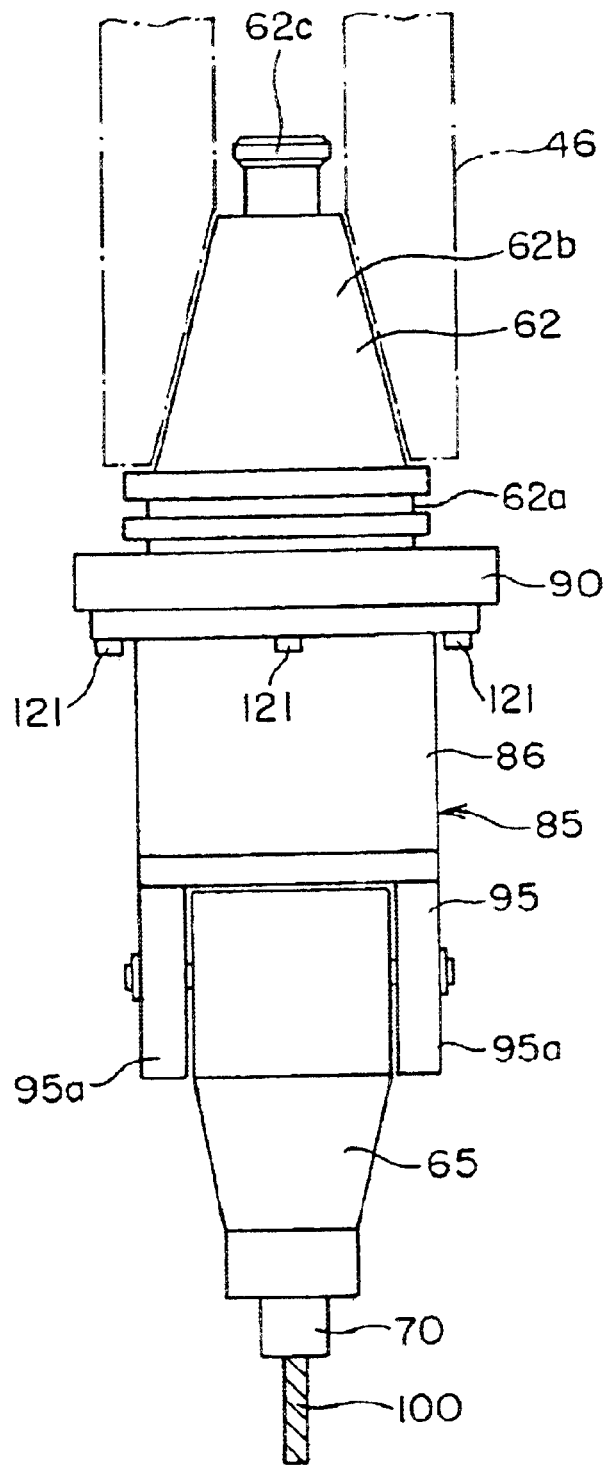
FIG. 3 is a side view of the tool shown in FIG. 2 seen from the direction of the arrow B.
Figure 4:
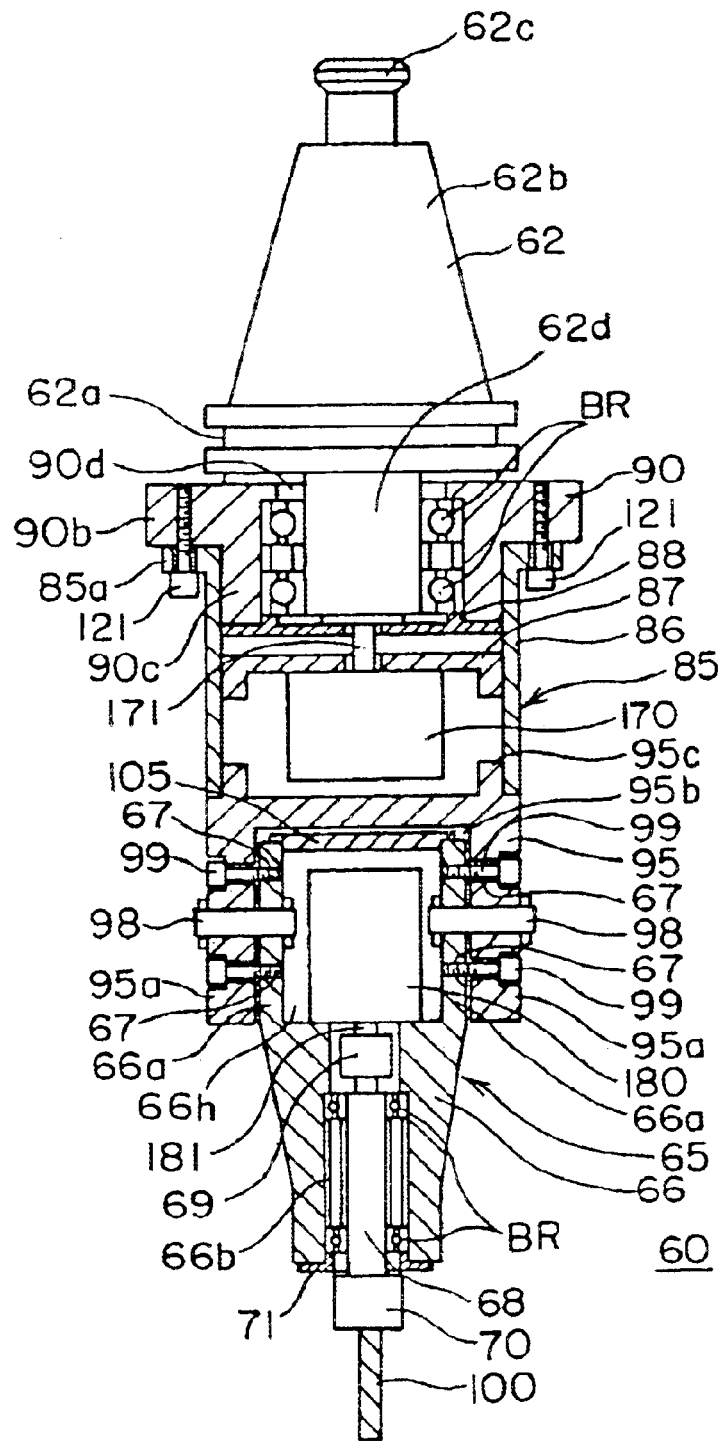
FIG. 4 is a sectional view of the tool shown in FIG. 2 along the line A—A.

FIG. 2 is a front view of the configuration of a tool according to an embodiment of the present invention. FIG. 3 is a side view of the tool shown in FIG. 2 seen from the direction of the arrow B. FIG. 4 is a sectional view of the tool shown in FIG. 2 in the direction of the line A—A.

As shown in FIG. 2, the tool 60 includes a cutting tool 100 and a tool holder 61 holding the cutting tool 100. Note that the cutting tool 100 is one embodiment of a working tool of the prevent invention.

The tool holder 61 is provided with a first holder 65, a second holder 85, and a mount 62. Further, an shown in FIG. 4, the tool holder 61 in provided with a motor 180 built into the first holder 65.

The mount 62 in provided with a gripper 62a to be gripped, a taper shank 62b to be attached to a taper sleeve 46a formed at a front end of the spindle 46, a pull stud 62c formed at a front end of the taper shank 62b, and a shaft 62d.

The gripper 62a of the attachment 62 is gripped when the tool is attached to the spindle 46 from the magazine of the automatic tool changer 39 and when it is transported from the spindle 46 to the magazine of the automatic tool changer 39 by the tool changing arm of the automatic tool changer 39.

The taper shank 62b of the mount 62 is attached to the taper sleeve 46a of the spindle 46, whereby its center axis becomes concentric with the center axis of the spindle 46.

The pull stud 62c of the mount 62 is clamped by a collet of a not shown clamp mechanism built into the spindle 46 when the mount 62 is attached to the taper sleeve 46a of the spindle 46. Note that the clamp mechanism built in the spindle 46 is known technology, so details will be omitted.

The shaft 62d of the mount 62, as shown in FIG. 4, is held rotatably by a plurality of roller bearings BR provided at the second holder 85.

The first holder 65, as shown in FIG. 4, has a holding member 66 provided with a through hole 66b at its inside and a housing hole 66h connecting with this through hole 66b. The two sides 66a of the top end of the holding member 66 are arranged in parallel to each other.

The holding member 66 is supported by support shafts 98 provided at the two sides 66a and can pivot about the support shafts 98.

The holding hole 66h of the holding member 66 has the motor 180 affixed in it. The through hole 66b has a rotary shaft 68 held rotatably in it through the bearings BR. One end of the rotary shaft 68 is connected to the output shaft 181 of the motor 180 by a coupling 69.

The other end of the rotary shaft 68 passes through a lock member 71 for preventing detachment of the bearings BR from the holding member 66. A chucking member 70 is affixed to its front end.

The chucking member 70 for example chucks a drill, and mill, or other cutting tool 100.

The top end of the housing hole 66h of the holding member 66 has an opening. This opening is closed by a cap 105. This cap 105 prevents oil or coolant used during the cutting from entering the housing hole 66h.

The second holder 85, as shown in FIG. 4, has a first member 95, a second member 86, and a third member 90.

The first member 95 has a disk-shaped part 95b, an engagement part 95c formed in a ring shape at a top surface of the disk-shaped part 95b, and support parts 95a extending in parallel to the bottom surface of the disk-shaped part 95b.

The support parts 95a are provided at an interval substantially equal to the distance between the two sides 66a of the holding member 66 and clamp the two sides 66a from the outside.

These support parts 95a are provided with the above support shafts 98.

The second member 86, as shown in FIG. 4, formed of a cylindrical member having a flange 85a at its top end. An engagement part 95c of the first member 95 is engaged with the inner periphery of the bottom end of the second member 86. The second member 86 and the engagement part 95c of the first member 95 are affixed by for example bolts or other fastening members.

The inner periphery of the second member 86, as shown in FIG. 4, has a flange member 87 engaged with it and affixed by bolts or other fastening members. A generator 170 is affixed to the bottom surface of the flange member 87.

The generator 170 has an input shaft 171 connected to a shaft 62 of the mount 62.

The third member 90, as shown in FIG. 4, formed of a cylindrical member and has at its top end an insertion hole 90d into which the shaft 62d of the mount 62 is inserted. Further, the outer periphery of the cylinder 90c is engaged with the inner periphery of the second member 86. Therefore, the second member 86 can rotate with respect to the third member 90.

The inner periphery of the third member 90 holds the shaft 62d of the mount 62 rotatably through a plurality of bearings BR. The plurality of bearings BR are locked by a looking member 88 affixed to the bottom end of the third member 90.

The flange 90b of the third member 90 is connected with the flange 85a of the second member 85 by a plurality of bolts 121.

Further, as shown in FIG. 2, one end 90a of the third member 90 is provided with a lock pin 91 so as to project out to the mount 62 side. This lock pin 91 is inserted into an engagement hole 47a formed in for example a nonrotating part 47 of the ram 45 etc. at the spindle 46 side by the mount 62 being attached in the taper sleeve 46a of the spindle 46.

Due to this, the third member 90, that is, the second holder 85 and first holder 65, is restricted from rotating even if the spindle 46 rotates.

Posture Adjustment Mechanism

The above first holder 65 is connected changeably in posture to the second holder 85.

Figure 5:
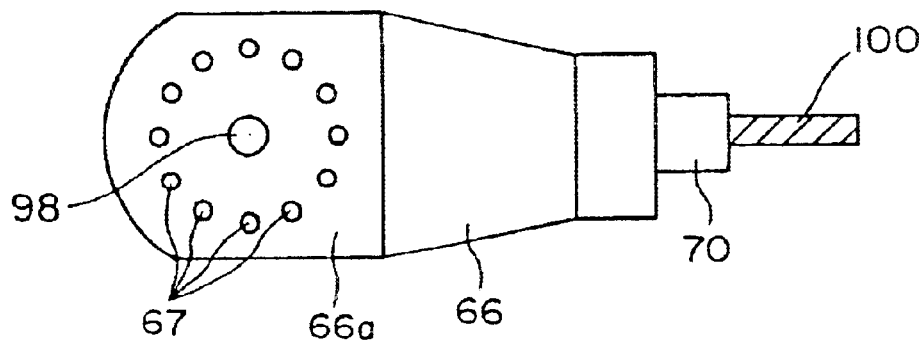
FIG. 5 is a side view of the structure of two sides of a holding member of a first holder.

FIG. 5 is a side view of the structure of the two sides 66a of the holding member 66 of the first holder 65.

As shown in FIG. 5, the two sides 66a of the holding member 66 are formed with a plurality of positioning screw holes 67 at equal intervals in the circumferential direction about the support shafts 98. The screw holes 67 are for example arranged at intervals of 30 degrees about the support shafts 98. The interval between the screw holes 67 in the minimum adjustment angle when adjusting the posture of the first holder 65 with respect to the second holder 85. The narrower the interval of the screw holes 67, the more possible fine adjustment of the posture becomes.

The screw holes 67 have a plurality of (four) bolts 99 shown in FIG. 2 and FIG. 4 screwed into them. Due to this, the first holder 65 and second holder 85 are connected. By removing the bolts 99 and adjusting the angle of tilt of the first holder 65 with respect to the second holder 85, then refastening the bolts, it is possible to adjust the posture of the first holder 65 in the direction shown by the arrow S in FIG. 2.

Rotational Position Adjustment Mechanism

The second member 86 and third member 90 of the second holder 85 are connected in a manner enabling change of the rotational position of the first holder 65 about the axis of the spindle 45.

Figure 6:
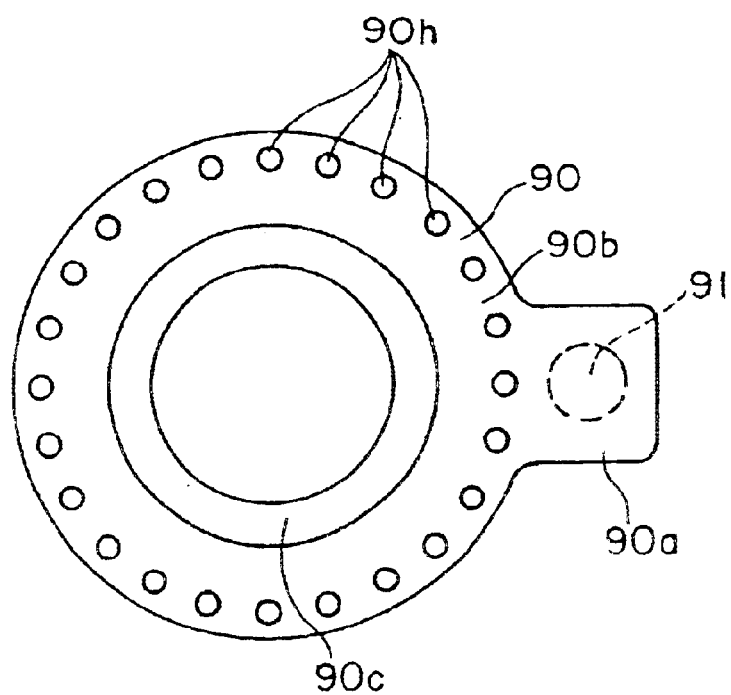
FIG. 6 is a side view of the configuration of a flange of a third member.

FIG. 6 is a side view of the configuration of the flange 90b of the third member 90.

As shown in FIG. 6, the flange 90 is formed with a plurality of screw holes 90h. These screw holes 67 are for example arranged at 30 degree intervals about the support shaft 98. The interval between the screw holes 90h is the minimum adjustment angle when adjusting the rotational position of the first holder 65 around the axis of the spindle 46.

The screw holes 90h, as shown in FIG. 2 to FIG. 4, have a plurality of (four) bolts 121 screwed into them. Due to this, the second member 86 and the third member 90 are connected.

By removing the bolts 121, rotating the second member 86 with respect to the third member 90 to position the third member 90 and second member 86 in relative rotation, and refastening the bolts 121, it is possible to adjust the rotational position of the first holder 65 around the axis of the spindle 46 shown by the arrow R in FIG. 2.

The generator 170 has an input shaft 171 connected concentrically with a shaft 62d of the mount 62. The generator receives as input the rotational force of the spindle 46 through the mount 62. The generator 170 used is for example a three-phase synchronous generator.

The motor 180 is supplied with the power generated by the generator 170. The motor 180 is driven by the power supplied from the generator 70. The motor 180 used is for example a three-phase induction motor.

Figure 7:
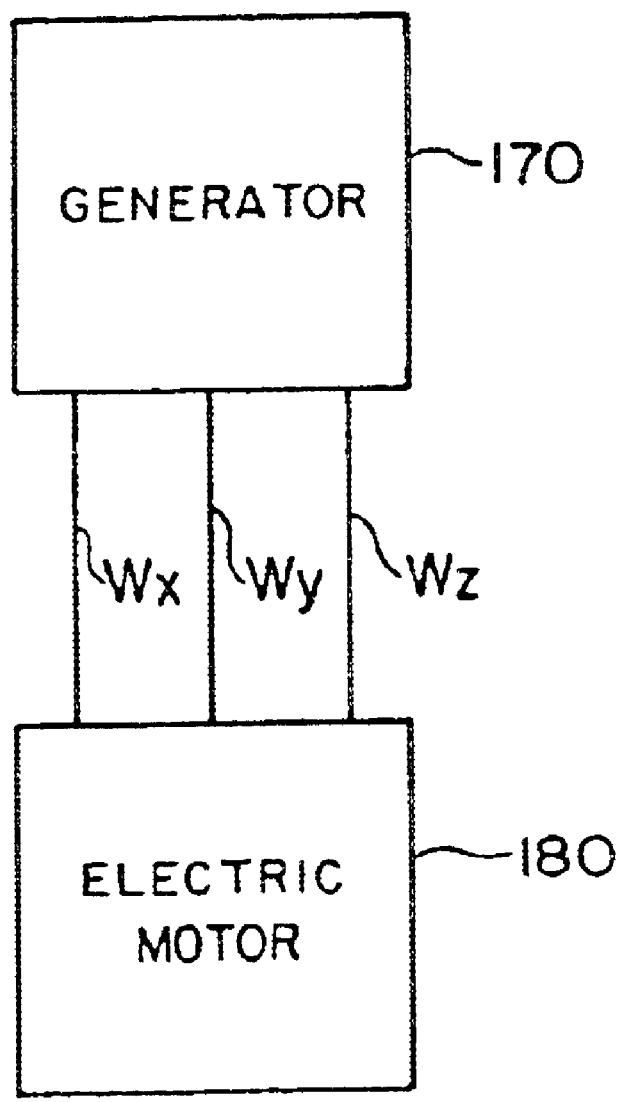
FIG. 7 is a view of a state of connection of a generator and motor when a three-phase synchronous generator is used for the generator and a three-phase induction motor is used for the motor.

FIG. 7 is a view of the state of connection of the generator 170 and the motor 180 in the case where a three-phase synchronous generator is used for the generator 170 and a three-phase induction motor is used for the motor 180.

As shown in FIG. 7, the motor 180 and generator 170 are connected by three conductive cables Wx, Wy, and Wz. The motor 180 is supplied with the three-phase AC generated by the generator 170.

Next, an example of the operation of the tool 60 of the above configuration will be explained.

In the state where the tool holder 61 holding the cutting tool 100 is attached to the spindle 46 of the machining center 1, when the spindle 46 is rotated by the rotational speed $N_0$, the mount 62 of the tool holder 61 rotates and the rotational force of the spindle 46 is transmitted to the generator 170.

At this time, the lock pin 91 is inserted in the engagement hole 47a formed in the nonrotating part 47 of the ram 45 etc., so only the mount 62 of the tool holder 61 rotates.

Due to this, the generator 170 generates power. The generator 170 generates three-phase AC when a three-phase synchronous generator is used.

The frequency f of the three-phase AC generated by the generator 170 is expressed by the following equation (1) when the number of poles of the generator 170 is $P_1$ and the rotational speed of the spindle 46 is $N_0$ (rpm);

$$f = P_1 \times N_0 / 120 \text{ (Hz)} \quad (1)$$

Therefore, if the spindle 46 is rotated by the rotational speed $N_0$, the three-phase AC power of the frequency f expressed by the above equation (1) is supplied to the motor 180.

Here, when using a three-phase induction motor for the motor 180, if the number of poles of the motor 180 is $P_2$, the motor 180 rotates by $2/P_2$ in one cycle of the three-phase AC, so the rotational speed $N_1$ of the motor 180 in expressed by the following equation (2):

$$N_1 = 120 \times f / P_2 \text{ (rpm)} \quad (2)$$

Therefore, the rotational speed $N_1$ of the tool with respect to the rotational speed $N_0$ of the spindle 46 is expressed by the following equation (3)

$$N_1 = N_0 \times P_1 / P_2 \text{ (rpm)} \quad (3)$$

As will be understood from equation (3), the rotational speed $N_0$ of the spindle 46 is changed to the rotational speed $N_1$ expressed by the above equation (3).

As shown by equation (3), by suitably setting the ratio of the number of poles $P_1$ of the generator 10 and the number of poles $P_2$ of the motor 180, the ratio of the rotational speed $N_1$ of the tool to the rotational speed $N_0$ of the spindle 46 can be freely set.

That is, when desiring to increase the rotational speed $N_0$ of the spindle 46, the pole number ratio $P_1/P_2$ is made larger than 1. When desiring to decrease the rotational speed $N_0$ of the spindle 46, the polo number ratio $P_1/P_2$ is made smaller than 1. It is sufficient to select the number of poles $P_1$ of the generator 170 and the number of poles $P_2$ of the motor 180 in advance in order to obtain the desired pole number ratio $P_1/P_2$.

Next, an example of the method of machining a workpiece using the tool 60 of the above configuration will be explained.

For example, when cutting a die or other workpiece, sometimes it is necessary to change the posture of the cutting tool 100 with respect to the workpiece in order to cut it.

On the other hand, the control axes of a machining center are limited. Sometimes it is not possible to change the posture of a cutting tool 100 with respect to a workpiece by just control of the control axes.

Figure 8:
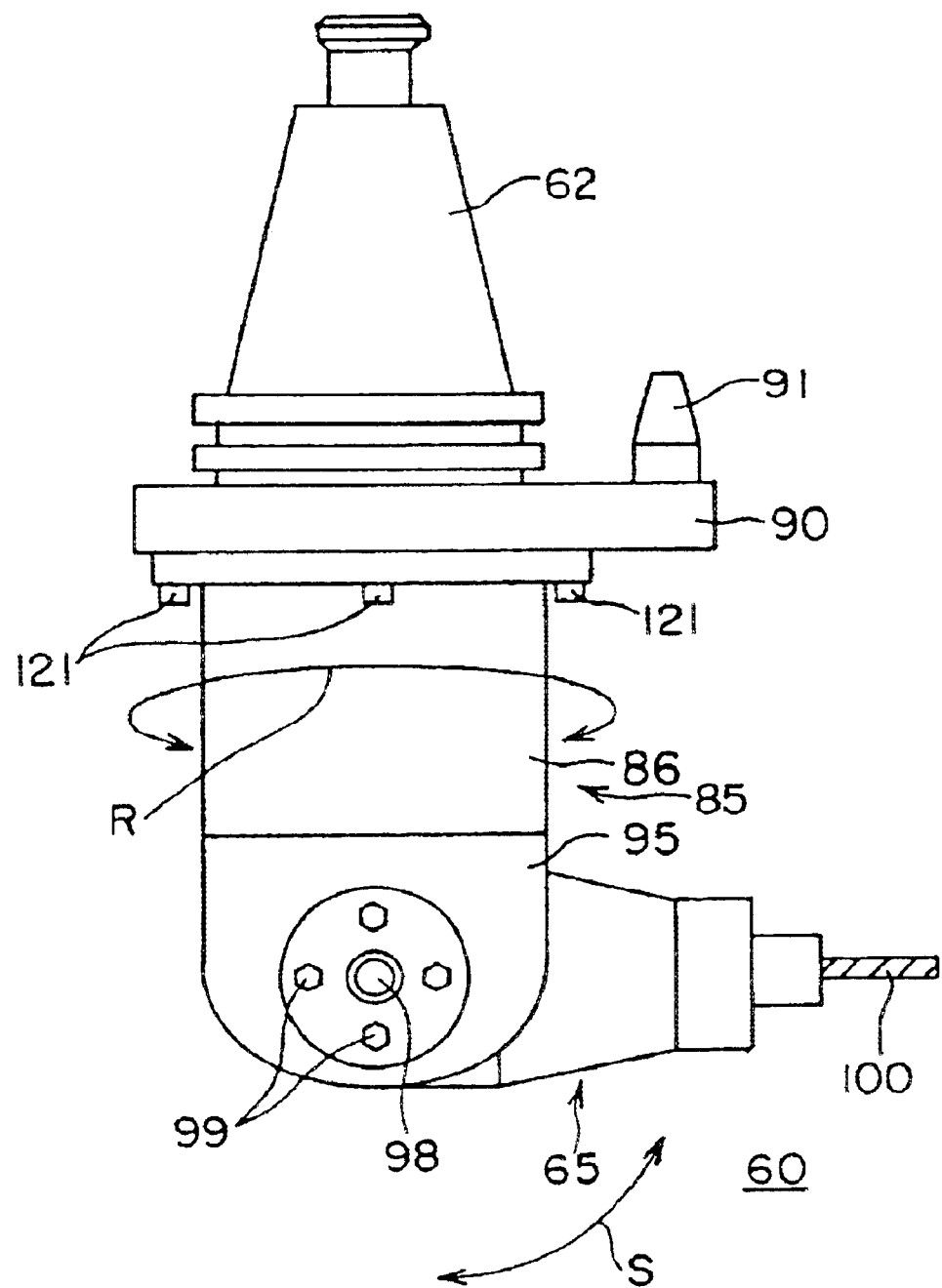
FIG. 8 is a view of an example of adjustment of the posture of the first holder of the tool with respect to a second holder.

Therefore, for example, as shown in FIG. 8, a plurality of tools 60 of the above configuration rotated in posture of the first holder 65 by a predetermined angle, for example, 90 degrees, with respect to the second holder 85 or suitably adjusted in rotational position of the first holder 65 in the arrow R direction are prepared in advance.

That is, tools 60 suitably adjusted in posture or rotational position in accordance with the machining conditions of the workpiece are stored in advance in the magazine of the automatic tool changer 39 of the machining center 1.

Further, when machining a workpiece comprised of a hard-to-cut material like an aluminum alloy material, sometimes it is desired to increase the rotational speed of the cutting tool 100 over the maximum rotational speed Nmax of the spindle 46.

In such a case, tools having a built-in three-phase synchronous generator and three-phase induction motor having a pole number ratio $P_1/P_2$ of 10 so that the ratio of speed increase of the tools 60 become for example 10 are stored in advance in the magazine of the automatic tool changer 39 of the machining center 1.

Next, the necessary tool 60 out of the plurality of tools 60 is automatically attached to the spindle 46 in the same way as an ordinary tool by the automatic tool changer 39. Note that an "ordinary tool" means one where the cutting tool is clamped by the tool holder.

The spindle 46 is made to rotate by driving the spindle motor 31, but the rotational speed of the cutting tool 100 hold by the tool holder 61 is controlled by the rotational speed of the spindle 46. That is, the rotational speed of the cutting tool 100 held by the tool holder 61 is defined by designating the rotational speed of the spindle 46 by the S-code in the machining program downloaded to the numerical control device 51.

For example, when desiring to make the cutting tool 100 held by the tool holder 61 rotate by 30,000 rpm, a tool 60 with the built-in three-phase synchronous generator and three-phase induction motor having a pole number ratio $P_1/P_2$ of 10 is attached to the spindle 46. In addition, the rotational speed of the spindle 46 is designated an 3000 rpm by the S-code in the machining program.

If the spindle 46 is made to rotate at 3000 rpm, the generator 170 generates three-phase AC of a frequency in accordance with the rotational speed of the spindle 46 and number of poles $P_1$.

The motor 180 is driven by the three-phase AC supplied from the generator 170. The cutting tool 100 held by the tool holder 61 rotates by a rotational speed of about 30,000 rpm.

By making the workpiece affixed to the table 35 and the cutting tool 100 (spindle 46) move relative to each other in accordance with a machining program in the state with the cutting tool 100 increased in speed as explained above, the workpiece is out.

Due to this, even when using a machining center 1 limited in the maximum rotational speed Nmax of the spindle, high speed machining of a workpiece comprised of an aluminum alloy material or other hard-to-cut material becomes possible.

When machining a workpiece, a tool 60 adjusted in posture of the cutting tool 100 is suitably selected and automatically attached to the spindle 46 by the automatic tool changer 39 in accordance with the angle of tilt of the machined surface of the workpiece.

Due to this, for example, even if the machined surface of the workpiece is complicated in shape, it can be easily handled by suitably selecting the tool 60.

That is, according to this embodiment, by using a tool 60 enabling free adjustment of the posture of the cutting tool 100 in a machining center with a limited number of control axes, it is possible to greatly increase the range of machining of the machining center 1 without any modification of the machining center 1.

According to this embodiment, since the generator 170 and motor 180 are built into the tool 60 formed as a unit in the same way as an ordinary tool and the cutting tool 100 is directly rotated by the motor 180 driven by power generated by the generator 170, an increase in the heat generated or a drop in machining accuracy without generation of vibration like in a gear device is suppressed.

In this embodiment, since the speed is changed using the generator 170 and motor 180, the cost can be lowered compared with use of a transmission mechanism using engagement such as a gear device and noise can also be suppressed.

According to this embodiment, since the tool 60 can be freely attached to the spindle 46 and can be changed in the same way as an ordinary tool by the automatic tool changer 39, the tool can be changed quickly.

According to this embodiment, since the cutting tool 100 is driven by the electric power generated by the rotation of the spindle 46, there is no need to supply drive current from the outside and as a result there is no need for wiring for supplying power.

Since this embodiment is configured using a three-phase synchronous generator as the generator 170 and a three-phase induction motor as the motor 180, the rotational speed of the cutting tool 100 hold by the tool holder 61 can be easily controlled by the rotational speed of the spindle 46. That is, since a three-phase synchronous generator generates a voltage of a frequency accurately proportional to the rotational speed of the spindle 46 and a three-phase induction motor drives the tool at a rotational speed proportional to that frequency, the rotational speed of the cutting tool 100 can be easily and accurately controlled by the rotational speed of the spindle 46 and the pole number ratio of the three-phase synchronous generator and the three-phase induction motor.

Since the motor 180 does not require a position detecting element for detecting the rotational position of the rotator, no wiring is required between the numerical control device 51 and the tool holder 61, the tool 60 can be made completely independent from the spindle 6, and the tool can be handled in exactly the same way as an ordinary tool.

Note that in the above embodiment, the explanation was made of the case of application to high speed machining of an aluminum alloy material, but the present invention can be applied to any case of machining requiring an increase of the rotational speed of the spindle 46. For example, it can be applied to machining of various hard-to-cut materials such an cemented carbide alloys, glass, and ceramics.

In the above embodiment, the explanation was made of the case of increasing the rotational speed of the spindle 46, but it is also possible to decrease the rotational speed of the spindle 46. In this case, it is possible to cause a torque greater than the spindle 46 to act on the cutting tool 100.

In the above embodiment, the explanation was made of the case of use of a three-phase synchronous generator as the generator 170 and a three-phase induction motor as the motor 180, but it is also possible to employ a configuration changing the rotational speed of the spindle 46 by a combination of a DC generator and a DC motor—although this is disadvantageous from the viewpoint of control of the rotational spend of the cutting tool 100. That is, the rotational speed of a DC motor is determined by the voltage supplied from the DC generator or the load, so it is difficult to directly control the rotational spend of the cutting tool 100 from the rotational speed of the spindle 46. By measuring the output characteristics or load characteristics of a DC motor and DC generator in advance, however, it is possible to change the rotational speed of the spindle 46 by a constant speed increase ratio or speed decrease ratio by a combination of the DC generator and DC motor. Further, it is also possible to use other types of generators and motors.

While the invention has been described with reference to preferred embodiments chosen for purpose of illustration, it should be apparent that numerous modifications could be made thereto by those skilled in the art without departing from the basic concept and scope of the invention.

The present disclosure relates to subject matter contained in Japanese Patent Application No. 2001-190170, filed on Jun. 22, 2001, the disclosure of which is expressly incorporated herein by reference in its entirety.

What is claimed is:

1. A tool to be attached to a spindle of a machine tool, comprising:

a working tool for processing a workpiece, a motor having an output shaft to which the working tool is connected and rotating said working tool, a first holder for holding said working tool and said motor, a mount attached to said spindle, a generator to which rotational force is transmitted from said spindle through said mount and generating electric power for driving said motor, a second holder for holding said mount rotatably, holding said generator, and engaged with a nonrotating portion of said machine tool, and a posture adjustment mechanism connecting said first holder and said second holder, and being able to change the angle of tilt of said first holder with respect to said second holder.

2. A tool as set forth in claim 1, further comprising a rotational position adjustment mechanism able to change a rotational position of said first holder about an axis of said spindle.

3. A tool as set forth in claim 1, wherein a rotational speed of said working tool with respect to a rotational speed of said spindle is changed by a predetermined speed change ratio determined based on a number of poles of said generator and said motor.

4. A tool as set forth in claim 1, wherein said generator comprises an AC generator supplying said motor with electric power having a frequency in response to a rotational speed of said spindle, and said motor comprises an AC motor rotating by a rotational speed in response to said frequency.

5. A tool as set forth in claim 4, wherein said generator comprises a three-phase synchronous generator, and said motor comprises a three-phase induction motor.

6. A tool holder for rotatably holding a working tool for processing a workpiece and attached to a spindle of a body of a machine tool, comprising a motor for rotating said working tool, a first holder for rotatably holding said working tool and holding said motor, a mount attached to said spindle, a generator to which rotational force is transmitted from said spindle through said mount and generating electric power for driving said motor, a second holder for holding said mount rotatably, holding said generator, and engaged with a nonrotating portion of said machine tool, and a posture adjustment mechanism connecting said first holder and said second holder, and being able to change the angle of tilt of said first holder with respect to said second holder.

7. A tool holder as set forth in claim 6, further comprising a rotational position adjustment mechanism able to change a rotational position of said first holder about an axis of said spindle.

8. A tool holder as set forth in claim 6, wherein a rotational speed of said working tool with respect to a rotational speed of said spindle is changed by a predetermined speed change ratio determined based on a number of poles of said generator and said motor.

9. A tool holder as set forth in claim 6, wherein
said generator comprises an AC generator supplying said motor with electric power having a frequency in response to a rotational speed of said spindle, and
said motor comprises an AC motor rotating by a rotational speed in response to said frequency.

10. A tool holder as set forth in claim 9, wherein
said generator comprises a three-phase synchronous generator, and
said motor comprises a three-phase induction motor.

11. A machine tool comprising:
a machine tool body comprising a spindle, a drive means for driving said spindle, and at least one control axis for changing a relative position between said spindle and a workpiece;
a control unit for controlling the drive of said drive means and control axis in response to a processing program; and
a tool attached to the spindle of said machine tool body, wherein
said tool comprises:
a working tool for processing a workpiece,
a motor having an output shaft to which said working tool is connected and rotating said working tool,
a first holder for holding said working tool and said motor,
a mount attached to said spindle,
a generator to which rotational force is transmitted from said spindle through said mount and generating electric power for driving said motor,
a second holder for holding said mount rotatably, holding said generator, and engaged with a nonrotating portion of said machine tool, and
a posture adjustment mechanism connecting said first holder and said second holder, being able to change the angle of tilt of said first holder with respect to said second holder.

12. A machine tool as set forth in claim 11, further comprising a rotational position adjustment mechanism able to change a rotational position of said first holder about an axis of said spindle.

13. A machine tool as set forth in claim 11, further comprising an automatic tool changer for attaching said tool to said spindle.

14. A machine tool as set forth in claim 11, wherein a rotational speed of said working tool with respect to a rotational speed of said spindle is changed by a predetermined speed change ratio determined based on a number of poles of said generator and said motor.

15. A machine tool as set forth in claim 11, wherein
said generator comprises an AC generator supplying said motor with electric power having a frequency in response to a rotational speed of said spindle, and
said motor comprises an AC motor rotating by a rotational speed in response to said frequency.

16. A machine tool as set forth in claim 15, wherein
said generator comprises a three-phase synchronous generator, and
said motor comprises a three-phase induction motor.

* * * * *